United States Patent [19]

Kapuscinski et al.

[11] Patent Number: 4,699,723

[45] Date of Patent: Oct. 13, 1987

[54] DISPERSANT-ANTIOXIDANT MULTIFUNCTION VISCOSITY INDEX IMPROVER

[75] Inventors: Maria M. Kapuscinski, Carmel; Ronald E. Jones, Glenham, both of N.Y.

[73] Assignee: Texaco Inc., White Plains, N.Y.

[21] Appl. No.: 898,276

[22] Filed: Aug. 20, 1986

[51] Int. Cl.$^4$ ............... C10M 149/10; C10M 151/02
[52] U.S. Cl. ........................................ 252/47; 525/73
[58] Field of Search ...................... 252/47.0; 525/73

[56] References Cited

U.S. PATENT DOCUMENTS

| | | | |
|---|---|---|---|
| 4,087,587 | 5/1978 | Shida et al. | 525/73 |
| 4,097,387 | 6/1978 | Caspari | 252/47 |
| 4,160,739 | 7/1979 | Stambaugh et al. | 252/34 |
| 4,181,618 | 1/1980 | Durand et al. | 525/73 |
| 4,229,308 | 10/1980 | Brulet et al. | 252/47 |
| 4,292,185 | 9/1981 | Bollinger | 252/47.5 |
| 4,303,539 | 12/1981 | Soag | 252/47 |
| 4,442,264 | 4/1984 | Zabrocki et al. | 525/73 |
| 4,504,625 | 3/1985 | Kitsunai et al. | 525/73 |
| 4,567,233 | 1/1986 | Tomono et al. | 525/73 |

*Primary Examiner*—William R. Dixon, Jr.
*Assistant Examiner*—Ellen M. McAvoy
*Attorney, Agent, or Firm*—Robert A. Kulason; James J. O'Loughlin; Vincent A. Mallare

[57] ABSTRACT

A multi-function Viscosity Index Improver having properties, including dispersancy and antioxidation, which comprises a functional ethylene-propylene copolymer having a dispersant/antioxidant unit grafted thereon.

15 Claims, No Drawings

DISPERSANT-ANTIOXIDANT MULTIFUNCTION VISCOSITY INDEX IMPROVER

This invention relates to hydrocarbons including hydrocarbon lubricating oils. More particularly, it relates to hydrocarbon lubricating oils which contain Viscosity Index Improvers made of polymers/monomers which permit attainment of improved properties.

BACKGROUND OF THE INVENTION

As is well known to those skilled in the art, hydrocarbon lubricating oils must be formulated, as by addition of various additives, to improve their properties.

In the case of lubricating oils, typified by those employed in railway, automotive, aircraft, marine etc. service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, etc.

It is an object of this invention to provide an additive system which imparts to lubricating oils these improved properties of viscosity index, dispersancy, oxidative stability, etc. Other objects will be apparent to those skilled in the art.

Also, it is noted a reduction in cost of lubricating oils can be made by using an additive which improves not only the viscosity index, but is also effective as dispersant and antioxidant. Such an additive can be prepared by incorporating dispersant and antioxidant units onto ethylene-propylene copolymer (EPM) or ethylene-propylene-diene terpolymers (EPDM). In particular, one or two monomers, with dispersant and antioxidant functionality, may be grafted onto the polymer to produce such multifunctional VI improver. In our invention, new dispersant and antioxidant VI improver is prepared by grafting only one monomer.

STATEMENT OF THE INVENTION

In accordance with certain of its aspects, this invention is directed to a polymer comprising an oil-soluble, substantially linear, carbon-carbon backbone polymer bearing dispersant and antioxidant units thereon, derived from a functional monomer containing at least one atom of nitrogen, sulfur, or oxygen in a cyclic ring structure.

DESCRIPTION OF THE INVENTION

The charge polymer which may be employed in practice of the process of this invention may include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from a monomer containing the grouping

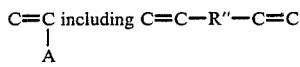

wherein A may be a hydrogen, hydrocarbon such as alkyl, aryl (particularly phenyl) etc., —OOCR typified by acetate or less preferred acyloxy (typified by —OOCR) halide, etc. R″ may be divalent hydrocarbon typified alkylene, alkarylene, cycloalkylene, arylene, etc.

Illustrative of such monomers may be acrylates, methacrylates, vinyl halides (such as vinyl chloride), styrene, olefins such as propylene, butylene, etc.; vinyl acetate; dienes such as butadiene, isoprene, hexadiene, ethylidene norbornene, etc. Homopolymers of olefins (such as polypropylene, polybutylene, etc.), dienes (such as hydrogenated polyisoprene), or copolymers of ethylene, with e.g. butylene and higher olefins, styrene, isoprene and/or butadiene may be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40-70 mole %, preferably 50-60 mole %, say 55 mole %, the remainder being derived from propylene.

The molecular weight $\overline{M}_n$ of the EPM copolymers which may be employed may be about 10,000 to about 1,000,000, preferably about 20,000 to about 200,000, and most preferably about 140,000. The molecular weight distribution may be characterized by $\overline{M}_w/\overline{M}_n$ of less than about 15, preferably 1.2-10, say 1.6.

Illustrative EPM copolymers which may be employed in practice of the process of this invention may be those set forth below in Table I, the first listed being pre-ferred.

TABLE I

A. The Epsyn brand of EPM marketed by Copolymer Rubber and Chemical Corporation containing 55 mole % of units derived from ethylene and 45 mole % of units derived from propylene, having a molecular weight $\overline{M}_n$ of 140,000 and $\overline{M}_w/\overline{M}_n$ of 1.6.

B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5.

When the charge polymer is ethylene-propylene-diene terpolymer (EPT or EPDM), it may be formed by copolymerization of ethylene, propylene, and diene monomers. The diene monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40-70 mole %, preferably 50-65 mole %, say 60 mole % and units derived from propylene in amount of 20-60 mole %, preferably 30-50 mole %, say 38 mole % and units derived from diene third monomer in amount of 0.5-15 mole %, preferably 1-10 mole %, say 2 mole %. The molecular weight $\overline{M}_n$ of the terpolymers may typically be about 10,000 to about 500,000, preferably about 20,000 to about 200,000, and most preferably about 120,000. Molecular weight distribution of the useful polymers is preferably narrow viz a $\overline{M}_w/\overline{M}_n$ of typically less than 10, preferably 1.5–5, say about 2.2.

Illustrative EPT terpolymers which may be employed in practice of the process of this invention may be those set forth below in Table II, the first listed being preferred.

TABLE II

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_w/\overline{M}_n$ of 2.2 and a molecular weight $\overline{M}_n$ of 120,000.

B. The Ortholeum 5655 brand of EPT marketed by DuPont containing 62 mole % of units derived from ethylene, 36 mole of units derived from propylene, and 2 mole % of units derived from 1,4-hexadiene and having a $\overline{M}_n$ of 75,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity index $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

E. The Epsyn 40A brand of EPT marketed by Copolymer Rubber and Chemical Corp. containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

The EPM and EPT polymers may contain minor portions (typically less than about 30%) of other units derived from other copolymerizable monomers.

It is a feature of the process of this invention that there may be bonded onto these oil-soluble, substantially linear, carbon-carbon, backbone polymers, dispersant and anti-oxidant units derived from a single functional monomer which contains at least one of nitrogen, sulfur, or oxygen in a cyclic ring. The functional monomer includes a polymerizable carbon-carbon ethylenically unsaturated double bond, and bonding may be effected under graft polymerization conditions.

The functional monomers which may be employed may be monocyclic; the nitrogen, sulfur or oxygen are contained in the same ring. In the preferred embodiment, the functional monomer may be monocyclic and the nitrogen and sulfur are in the same cyclic ring.

The monomers that may be used include vinyl or alkyl compounds containing thiazole or benzothiazole groups. The preferred monomer is 4-methyl-5 vinyl-thiazole.

In practice of the process of this invention, 100 parts of charge EPM or EPT may be added to 100–1000 parts, say 300 parts of diluent-solvent. Typical diluent-solvent may be a hydrocarbon solvent such as mineral grafting oil, n-hexane, n-heptane, or tetrahydrofuran. The reaction mixture may then be heated to reaction conditions of 60° C.–180° C., preferably 150° C.–170° C., say 155° C. When low temperature boiling solvent is used, such as n-hexane, the process is performed in a pressure reactor at 15–300 psig, preferably 180–220 psig, say 200 psig.

Functional monomer, typically 4-methyl-5-vinyl thiazole, is admitted in amount of 1–40 parts, say 5 parts, as a solution in 2–20 parts, say 5 parts of diluent-solvent. There is also added a solution in hydrocarbon of free radical initiator. Typical free radical initiators may include dicumyl peroxide, di-tertiary-butyl peroxide, benzoyl peroxide, di-isopropyl peroxide carbonate azobisisobutyronitrile, etc. The solvent is preferably the same as that in which the EPM or EPT is dissolved. The initiator may be added in amount of about 0.2 to about 40 parts, preferably 1 part in about 0.8 to about 120 parts, and most preferably about 3 parts of diluent solvent.

The reaction is carried out at a temperature at least as high as the decomposition temperature of the initiator typically at about 70° C. to about 200° C., preferably about 155° C., for 5 minutes to 5 hours, preferably 10 minutes to 3 hours, say 1 hour when grafting of the functional monomer onto the base EPM or EPT polymer occurs.

For ease of handling, enough mineral oil, such as SUS 100 oil typified by SNO-100 is then added to obtain a fluid concentrate product at room temperature. The product is typically obtained as a solution of about 4 to about 20 parts, preferably about 9.0 parts thereof in about 80 to about 96 parts, preferably about 91.0 parts of oil. When the grafting reaction is carried out in hexane (or other low boiling solvent), a stripping step is included.

Typically the product may by contain about 0.1 to about 60, preferably about 3 units derived from functional monomer per 1000 carbon atoms of the charge backbone polymer.

It is a feature of this invention that the so-prepared polymer solution in oil may find use in lubricating oils as multifunctional additive (e.g. dispersant viscosity index improvers which provide anti-oxidant properties, etc) when present in effective amount of about 0.2 to about 5 w %, preferably 0.4–3 w %, preferably about 0.9 w %.

Lubricating oils in which the multifunctional additives of this invention may find use may include automotive, aircraft, marine, railway, etc. oils; oils used in spark ignition or compression ignition; summer or winter oils; etc. Typically the lubricating oils may be characterized by an ibp of about 570° F. to about 660° F., preferably 610° F.; an ep of about 750° F. to about 1200° F., preferably 1020° F.; and an API gravity of about 25 to about 31, preferably about 29.

A typical lubricating oil in which the polymer of this invention may be present may be a standard SAE 5W-30 hydrocarbon motor oil formulation having the following com- position:

TABLE

| | W % |
|---|---|
| Base Oil | 82 |
| Viscosity Index Improver (additive of this invention) (10 w % ethylene-propylene copolymer in 90% inert oil) | 9 |
| Standard Additive Package: | 9 |
| Polyisobutenyl ($\overline{M}_n$ 1290) succinimide (dispersant); | |
| calcium sulfonate (detergent); | |

TABLE-continued

| | W % |
|---|---|
| Zinc dithiophosphate (anti-wear); di-nonyl diphenyl amine (anti-oxidant); 4,4'-methylene-bis (2,6-di-t-butyl phenol) (antioxidant); | |

Use of the additive of this invention makes it possible to readily increase the viscosity index by 25-40 units, say 35 units and to obtain improved ratings on the tests measuring the dispersancy of the system. The viscosity index is determined by ASTM Test D-445.

The present invention comprises making dispersant and antioxidant VI improvers by derivating hydrocarbon polymers such as ethylene-propylene copolymer (EPM), or ethylene-propylene-diene terpolymer (EPDM) with, e.g., 4-methyl-5-vinyl thiazole (MVT).

MVT is grafted onto polymer in presence of a free radical initiator such as, but not limited to, dicumyl peroxide according to the following reaction:

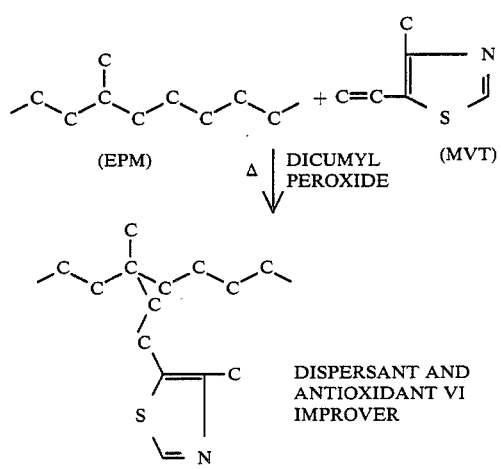

The process can be carried out in the following manner:

A solution containing 5-30 parts of EPM and 75 parts of solvent, such as mineral oil or n-hexane is prepared. The stirred solution is heated at about 80 to about 150° C. in the presence of nitrogen to form homogeneous solution. About 0.2 to about 20 parts of MVT is charged at temperature above the decomposition temperature of the initiator, followed by about 0.02 to about 20 parts of initiator. The mixture is heated, with stirring, under nitrogen for about 0.5 to about 5 hours. Typically, 25 parts of EPM, 75 parts of mineral oil, 1.25 parts of MVT and 0.5 parts of initiator, dicumyl peroxide are used. The reaction mixture is maintained at 155° C. ±5° C. for 1 hour.

Enough mineral oil is then added to obtain a fluid concentrate at room temperature (about 6 to about 12 wt. % polymer solution), typically about a 9 wt. % polymer solution. The fluid solution is used for further testing.

The polymers used herein are substantially linear, hydrocarbon polymers. These include the oil soluble ethylene-propylene based copolymers, saturated and unsaturated, containing about 35 to about 65 wt.% polymerized ethylene units. This includes ethylene-propylene copolymers (EPM) or diene terpolymers (EPDM) such as a ethylene-propylene-1,4-hexadiene terpolymer or a ethylene-propylene2-norbornene terpolymer.

Any of the typical free radical initiators, such as dicumyl peroxide, di-tert-butylperoxide, asobisisobutyronitrile, diacetyloperoxide and diisopropyl peroxidicarbonate may be employed in this process.

The monomers used may be vinyl or alkyl compounds containing thiazole or benzothiazole groups.

The polymeric materials of this invention may be added to lubricating oil compositions to impart improvements in viscosity index, dispersancy or thermal-oxidative stability. Typical lubricating oils, to which the additives of this invention may be added, include summer or winter automotive lubricating oils, diesel engine lubricants, railway diesel oils, etc.

Addition of the above invention additives, to a lubricating oil, may be facilitated by use of a concentrate containing about 1 to about 20 wt. %, preferably about 4 to about 15 wt. % of polymer.

The tests and analysis used, according to the present invention, are provided below.

TESTS AND ANALYSIS

1. Oxidation Stability—The antioxidant activity of the new antioxidant and dispersant VI improver was examined by a proprietary test called Bench Oxidation Test (BOT). In this test the polymer solution is diluted with SNO-130 oil. The mixture is heated with stirring and air agitation. Samples are withdrawn periodically for analysis, by differential infrared analysis (DIR), to observe changes in the intensity of the carbonyl vibration band at 1710cm-1. Higher carbonyl group intensity indicates a lower thermal oxidative stability of the sample. The result reported, as oxidation index, indicates the change in the intensity of the carbonyl vibration band at 1710cm-1 after 144 hours of oxidation. A lower rating indicates better thermal-oxidative stability of the mixture.

2. Dispersancy—The sample is blended into a formulated oil, not containing a dispersant, to form 0.9 wt. % polymer solution. That blend is tested for dispersancy in the Bench VC Test.

In that test, dispersancy is compared to that of three reference oils (which give excellent, good or poor results in the test), which are tested along with the experimental samples. The numerical value of a test result decreases with an increase in dispersant effectiveness.

3. Grafting Yield—The amount of grafted MVT is determined by elemental analysis of N (Khejdall method).

Practice of the process of this invention will be apparent to those skilled in the art from the following examples wherein, as elsewhere in this specification, all parts are parts by weight unless otherwise set forth. Control examples are designated by an asterisk.

DESCRIPTION OF THE PREFERRED EMBODIMENTS

EXAMPLE I

In this example, 4-methyl-5-vinylthiazole (MVT), is grafted onto EPM (Mn-140,000) containing approximately 55 mole % of ethylene.

One hundred parts of EPM, dissolved in 400 parts of mineral grafting solvent (SUN-148), is heated to 155° C. with stirring and under nitrogen. Five parts (0.04 moles) of MVT, diluted with 5 parts of SUN-148 is added, followed by 2 parts of dicumyl peroxide, dissolved in 6 parts of SUN-148. The mixture is stirred, using above conditions, for 1 hour.

Next, a solvent neutral oil (SNO-100) is added to give a solution containing 9 wt. % polymer. This solution is added to lubricating oil and used in further testing.

EXAMPLE II

In this example, 9 wt. % EPM solution, in mineral oil, is prepared.

One hundred parts of EPM is added to 400 parts of SUN-148 and 611 parts of SNO-100. The mixture is heated at 155° C., with stirring and under nitrogen, for two hours.

As shown below in Table III, a sample of Example I containing thiazole units (0.8 mole% grafted MVT), shows good dispersant and antioxidant activity. A sample of Example II, which contains unmodified EPM, shows neither dispersant nor antioxidant activity.

TABLE III

| PROPERTIES OF VI IMPROVERS | | |
|---|---|---|
| | Example (Sample) | |
| Materials | I | II |
| EPM (g) | 100.0 | 100.0 |
| MVT (g) (1) | 5.0 | — |
| Oxidation Index (2) | 5.6 | 15.9 |
| Dispersancy | | |
| Result | 49.0 | 95.0 |
| Standards excellent/good/poor | 11.3/30.2/62.0 | 11.3/30.2/52.0 |

(1) Change in the intensity of the carbonyl group vibration band at 1710 cm-1 after 144 hours in Bench Oxidation Test.
(2) As measured by Bench VC Test

We claim:

1. A multifunctional Viscosity Index Improver, having properties of dispersancy and antioxidation, comprising an oil-soluble, substantially linear functional ethylene-propylene copolymer having grafted thereon through an alkyl group a heterocyclic ring containing at least one atom of N, S, or O.

2. The multifunctional Viscosity Index Improver of claim 1, wherein said monomer is 4-methyl-5-vinylthiazole.

3. A method of preparing a multifunctional Viscosity Index Improver, having properties including dispersancy and antioxidation, said method comprises grafting a thiazole/benzothiazole vinyl/allyl monomer onto an ethylene-propylene copolymer in the presence of a free-radical initiator.

4. The method of claim 3, wherein said vinyl/allyl monomer is 4-methyl-5-vinylthiazole.

5. The method of claim 3, wherein said copolymer is replaced with ethylene-propylene-diene terpolymer.

6. The method of claim 3, wherein said free-radical initiator is selected from the group consisting of dicumyl peroxide, di-tertiary-butyl-peroxide, azobisisobutyronitrile, diacetylperoxide and diisopropyl peroxide-carbonate.

7. The method of claim 3, wherein the reaction mixture is maintained at about 155° C. for about 1 hour.

8. The method of claim 3, wherein said Viscosity Index Improver is added to a lubricating oil in an amount of about 0.05 to about 4.0 wt.% of the polymer.

9. The method of claim 8, wherein said Viscosity Index Improver is added to said lubricating oil in an amount of about 0.08 to about 2.0 wt. % of the polymer.

10. A lubricating oil composition comprising a major portion of a lubricating oil and a minor effective amount of a dispersant/antioxidant Viscosity Index Improver comprising an oil soluble, substantially linear, carbon-carbon backbone polymer having grafted polymerized thereon units derived from a thiazole/benzothiazole vinyl/alkyl monomer.

11. The lubricating oil composition of claim 10, wherein said monomer is 4-methyl-5-vinyltlthiazole.

12. The lubricating oil composition of claim 10, wherein said backbone polymer is a copolymer of ethylene-propylene or of ethylene-propylene-diene terpolymer.

13. The lubricating oil composition of claim 10, wherein the molecular weight $\overline{M}_n$ of said backbone polymer is about 10,000 to about 1,000,000.

14. The lubricating oil composition of claim 10, wherein said minor effective amount is about 1 to about 20 wt. %.

15. A lubricating oil composition comprising a major portion of a lubricating oil and 0.1 to about 10 wt. % of, as an additive, a graft polymer comprising an oil-soluble, substantially linear, carbon-carbon backbone copolymer of ethylene propylene or a terpolymer of ethylene propylene-third diene monomer having graft polymerized thereon units derived from 4-methyl-5-vinylthiazole.

* * * * *